Feb. 12, 1957

C. W. ZIMMERMAN ET AL
METHOD AND APPARATUS FOR MEASURING FLUID
SATURATION OF CORE SAMPLES 2,781,488

Filed Aug. 27, 1953

CARL W. ZIMMERMAN
PAUL P. REICHERTZ
WILLIAM C. SKINNER
INVENTORS

BY Frederick E. Dumoulin
ATTORNEY

Feb. 12, 1957 C. W. ZIMMERMAN ET AL 2,781,488
METHOD AND APPARATUS FOR MEASURING FLUID
SATURATION OF CORE SAMPLES
Filed Aug. 27, 1953 2 Sheets-Sheet 2
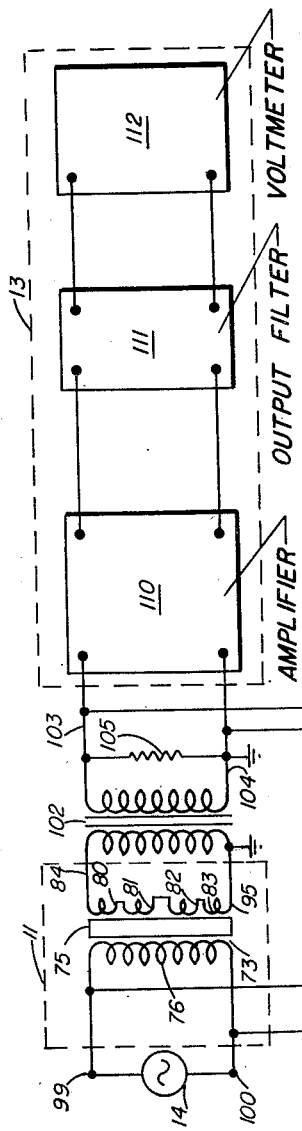
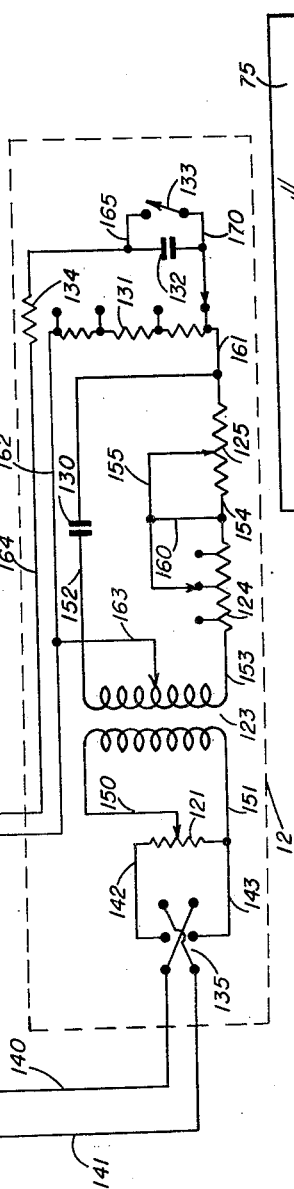
CARL W. ZIMMERMAN
PAUL P. REICHERTZ
WILLIAM C. SKINNER
INVENTORS
BY Frederick E. Dumoulin
ATTORNEY United States Patent Office 2,781,488
Patented Feb. 12, 1957

2,781,488

METHOD AND APPARATUS FOR MEASURING FLUID SATURATION OF CORE SAMPLES

Carl W. Zimmerman, Paul P. Reichertz, and William C. Skinner, Dallas, Tex., assignors, by mesne assignments, to Socony Mobil Oil Company, Inc., a corporation of New York Application August 27, 1953, Serial No. 376,924

16 Claims. (Cl. 324—13)

This invention relates to the measurement of fluid saturation of a porous material and relates more particularly to a method and apparatus for measuring fluid saturation of a porous material containing at least two fluid phases.

In the solution of many problems relating to the performance of a subterranean petroleum oil reservoir, it is often desirable or necessary to know the permeability of the porous earth material of the reservoir to each of the fluid phases contained within the reservoir. Generally, it has been the practice to determine experimentally from core samples taken from the reservoir the permeability of the reservoir material to each fluid phase as a function of the void volume of the reservoir filled with each fluid phase. This information is expressed as relative permeability, i. e., the ratio of the permeability to a given fluid in the presence of another fluid phase or phases to the permeability to the given fluid phase in the absence of any other fluid phase. In the measurement of the permeability of the core samples, however, a problem arises in the determination of the saturation of the core samples with respect to each of the fluid phases.

It is an object of this invention to provide a method and apparatus for measurement of the fluid saturation of a porous material. It is another object of this invention to provide a method and apparatus for measurement of the fluid saturation of a core sample. It is another object of this invention to provide a method and apparatus for measurement of the water saturation of a core sample containing at least one other fluid phase. It is another object of this invention to provide a method and apparatus for the measurement of fluid saturation of a core sample during measurement of relative permeability. Other objects of the invention will become apparent from the following detailed description thereof.

Figure 2 is a schematic view of the detecting head of Figure 1 showing a core sample in position in one arm thereof.

Figure 3 is a schematic diagram of the electrical circuit of the detecting head of Figure 1.

Figure 4 is a schematic diagram of an electrical circuit for measuring fluid saturation of a core sample in accordance with one embodiment of the invention.

Figure 1:
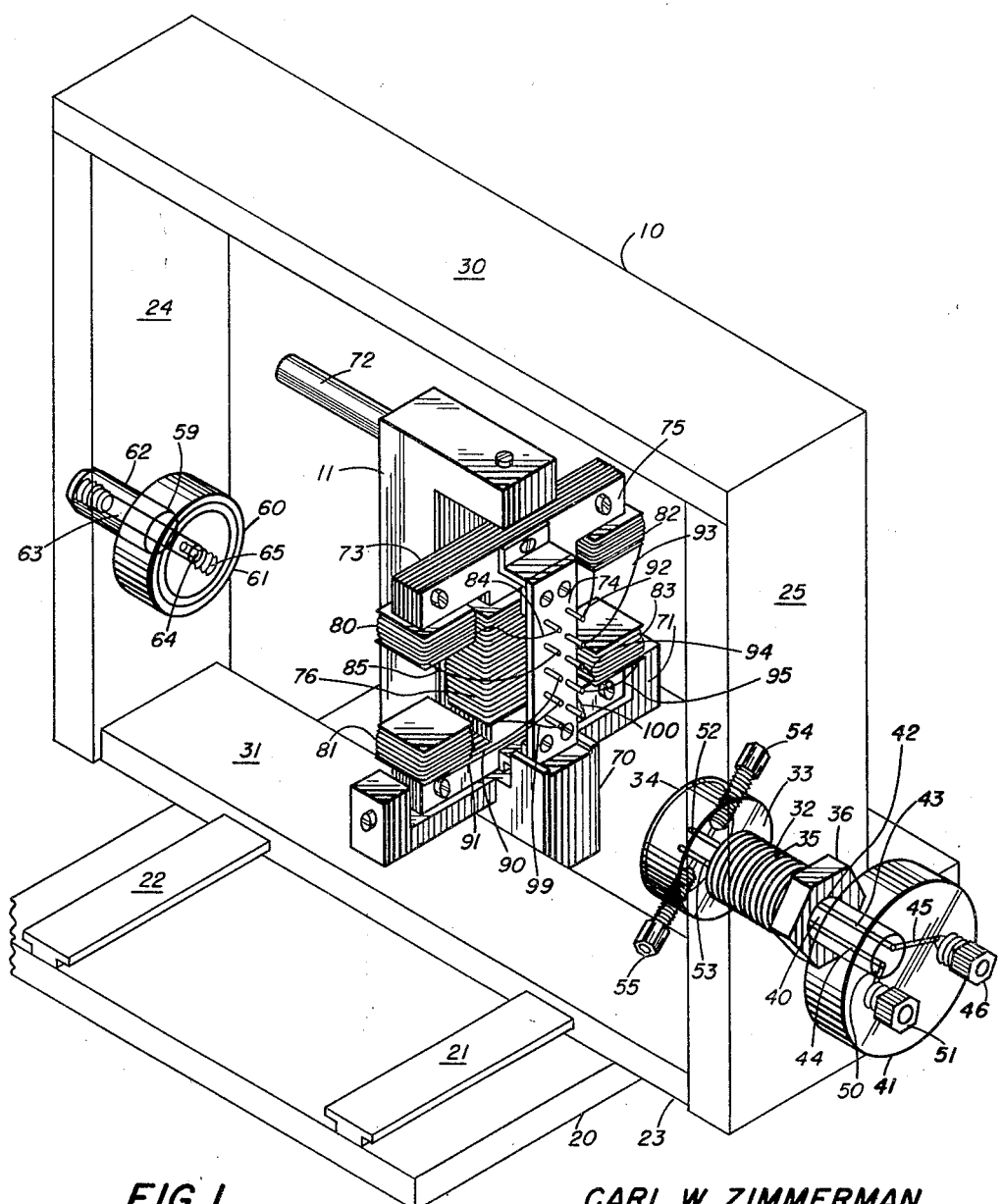
Figure 1 is an isometric view of the detecting head and the core sample holder of apparatus for measuring the fluid saturation of a core sample constructed in accordance with one embodiment of the invention.

The present invention is predicated upon the discovery that by admixing a paramagnetic material in one of the fluid phases whose relative permeability in a core sample or other porous material is to be measured and determining the change in magnetic susceptibility of the core sample or other porous material after such fluid phase is contained therein, the quantity of such fluid phase contained in the core sample or other porous material, or the extent of saturation of the core sample or other porous material by such fluid phase, can also be determined.

Referring now to the figures, the apparatus illustrated therein comprises generally a core sample holder 10, a detecting head 11, a nulling circuit 12, a metering circuit 13, and a source of alternating current 14.

Referring specifically to Figure 1, the detecting head 11 is mounted upon base 20 which is provided with a pair of guides 21 and 22 extending parallel to each other. Fitting over and slidably mounted on the guides 21 and 22 is framework 23 comprising two upright members 24 and 25 and two horizontal members 30 and 31.

Extending through threaded port 32 in upright member 25 is receiver 33 adapted to receive the end of a core sample. The receiver 33 comprises generally socket member 34, threaded member 35 provided with flange 36, cylindrical member 40, and face member 41. The threaded member 35 threads through the port 32 in upright member 25 and may be turned by means of torque applied to the flange 36. The threaded member 35 abuts against the socket member 34 and movement of the threaded member 35 towards the inner portion of the framework will move the socket member 34 in the same direction. The cylindrical member 40 is movably received within channel 42 in the threaded member 35 and is fixedly connected to socket member 34 and face member 41. Extending throughout the length of cylindrical member 40 are channels 43 and 44. While two channels are shown, it will be understood that an additional channel may also be provided in cylindrical member 40. Channel 43 connects with channel 45 in face member 41 and channel 45 leads to fitting 46. Channel 44 connects with channel 50 in face member 41 and channel 50 leads to fitting 51. Channel 43 leads to channel 52 in socket member 34 and channel 44 leads to channel 53 in socket member 34. Each of channels 52 and 53 leads to the face of the socket member 34. Leading to channels 52 and 53 are manometer taps 54 and 55, respectively.

Extending horizontally through port 59 in upright member 24 is receiver 60 adapted to receive the other end of a core sample and comprising socket member 61 and cylindrical member 62. The cylindrical member 62 is provided with a channel 63 extending through the entire length thereof and leading to channel 64 in the socket member 61. Channel 65 connects to channel 64 at right angles thereto for connection with a manometer tap.

For measurement of relative permeability, a core sample taken from the earth is coated, after proper cleaning, over its entire surface with a fluid impermeable material which is non-magnetic and non-conductive, such as Lucite. Generally, the core sample is in the shape of a cylinder, and for purposes of illustration it will be assumed that the core sample is cylindrical, although it will be understood that other shapes having a uniform cross-sectional area perpendicular to direction of the flow of fluids through the core sample during measurement of permeability may be employed. Further, the shape of the coating of fluid impermeable material applied to the core sample will be such that the end faces of the coated core sample will fit within the socket members 61 and 34. After coating with the fluid impermeable material, two channels are drilled through the coating to the core sample from one end face thereof for passage to the core sample of the fluids in the measurement of relative permeability. At the opposite face of the core sample, a single channel is drilled through the coating for passage from the core sample of the fluids. The core sample is then positioned in the framework 10 between the receivers 33 and 60, the end of the core sample having the two channels leading through the coating being fitted within the socket member 34 so that one channel abuts upon channel 52 and the other channel abuts upon channel 53, and the other end of the core sample having the single channel through the coating being fitted within socket member 61 so that the channel therein abuts upon channel 64. Flange 36 may then be turned to force the socket member 34 in the direction of socket member 61 whereby the coated core sample is held in fluid-tight relationship between the receivers 33 and 60. The preparation of the core sample with respect to the coating and the provision of the channels therein, as well as the procedures mentioned hereinafter for measurement of relative permeability, are well understood in the art and form no part of this invention and, accordingly, no greater detail in explanation than is given is considered necessary.

The detecting head 11 consists essentially of a base 70 attached to the base 20, a transformer support 71 affixed to the base 70, a handle 72 affixed to the base 70, a transformer 73, and a terminal board 74. The transformer 73 comprises core 75, primary coil 76 and four secondary coils 80, 81, 82, and 83. Coil 80 is connected in series aiding with coil 81, coil 82 is connected in series aiding with coil 83, and the pair of coils 80 and 81 are connected in series opposition with the pair of coils 82 and 83. Connected to secondary coil 80 are conductors 84 and 85, connected to secondary coil 81 are conductors 90 and 91, connected to secondary coil 82 are conductors 92 and 93, and connected to secondary coil 83 are conductors 94 and 95. Connected to primary coil 76 are conductors 99 and 100. Coils 80 and 81 and coils 82 and 83 are positioned with respect to the level of receivers 33 and 60 such that a core sample supported by the receivers 33 and 60 will be at the level of the air gaps between the coils 80 and 81 and the coils 82 and 83.

The base 20, the guides 21 and 22, the framework 23, the receiver 33, the receiver 60, the base 70, the support 71, and the handle 72 are all constructed of non-magnetic, non-conductive materials. A plastic material such as Lucite has been found to be satisfactory and the apparatus, as illustrated in Figure 1, is constructed of such plastic material, which material, in addition to its other properties, is transparent.

The core 75 of transformer 73 is made of high permeability material in order to be properly responsive to changes in the magnetic susceptibility of the core sample 101 when positioned within the gap between secondary coils 80 and 81, or within the gap between secondary coils 82 and 83. A suitable material for the core 75 is an alloy currently marketed by Westinghouse Electric Corporation under the trade name "conpernick". While the number of turns on the primary coil and each of the secondary coils of transformer 73 may vary, and wire of different sizes may be used for the coils, satisfactory results are obtained where the primary coil 76 consists of 780 turns of No. 30 copper wire and each of the secondary coils 80, 81, 82, and 83 consists of 400 turns of No. 35 copper wire. It is preferred that each of the laminations making up the core 75 of the transformer 73 be connected to each other at one point only and this point be grounded in order to eliminate effects of hand capacity.

Referring now to Figure 4, the primary coil 76 is connected by conductors 99 and 100 to the source of alternating current 14 such as an oscillator, which preferably supplies voltage at high amplitude and at a stable frequency. The frequency of the current provided by the source of alternating current 14 is preferably one thousand cycles per second although somewhat higher and lower frequencies may also be employed. The amplitude of the voltage utilized will depend upon the rating of the transformer 73 and should be such that the material constituting the core 75 operates upon the linear portion of its characteristic. With the transformer 73 having the number of turns of specified wire described above, satisfactory results are obtained where the source of alternating current has an output voltage level of twenty volts.

Conductors 84 and 95 are connected to transformer 102 and conductor 95 is grounded. Preferably, the primary coil of transformer 102 has an impedance equal to the total impedance of the secondary coils 80, 81, 82, and 83 of transformer 73. Conductors 103 and 104 are connected to the secondary coil of transformer 102 and to the metering circuit 13. Connected in parallel with the secondary coil of transformer 102 is resistor 105 which provides proper loading for transformer 102.

The metering circuit 13 comprises in series a high impedance amplifier 110, an output filter 111, and voltmeter 112.

Nulling circuit 12 comprises potentiometer 121, transformer 123 having a center-tapped secondary coil, attenuator 124, potentiometer 125, decade condenser 130, attenuator 131, condenser 132, single pole, single throw switch 133, resistor 134, and double pole, double throw switch 135. Conductors 140 and 141 connect conductors 99 and 100 to one pair of terminals of switch 135. Conductors 142 and 143 connect the center terminals of switch 135 potentiometer 121. Switch 135 may be operated to connect conductor 141 with conductor 142 and conductor 140 with conductor 143 at one position and to provide the reverse connections at another position of the switch. Potentiometer 121 is connected by conductors 150 and 151 to the primary coil of transformer 123. One terminal of the secondary coil of transformer 123 is connected by way of conductor 152 and the decade condenser 130 to one side of potentiometer 125. The other terminal of the secondary coil of transformer 123 is connected to one side of attenuator 124 by conductor 153. Conductor 154 connects the other side of attenuator 124 with the other side of potentiometer 125. Conductor 155 interconnects the variable taps of attenuator 124 and potentiometer 125. Conductor 160 connects conductor 155 to conductor 154. Conductor 161 leads to one side of attenuator 131 and conductor 162 leads from the other side of attenuator 131 to conductor 104 which is grounded. Conductor 163 connects conductor 162 to the center tap on the secondary coil of transformer 123. A series circuit formed by conductor 164, resistor 134, and condenser 132 connects conductor 103 to the variable tap of attenuator 131. Shorting switch 133 is connected in parallel with condenser 132 by means of conductors 165 and 170.

As hereinabove stated, the extent of saturation of a core sample or other porous material by a fluid phase is determined by determining the change in magnetic susceptibility of the core sample or other porous material after the fluid phase admixed with a paramagnetic material is contained within the core sample or other porous material. By means of the apparatus hereinabove described, the relative magnetic susceptibility of a core sample or other porous material may be determined whereby the extent of saturation by a fluid phase admixed with a paramagnetic material may be determined.

In the operation of the apparatus, the change in relative magnetic susceptibility is determined from the change in mutual inductance between the primary coil 76 and either of the secondary coils 80 and 81 or 82 and 83, respectively, by including the core sample or other porous material as a part of the magnetic flux path of the transformer 73. Since the change in mutual inductance between the primary coil 76 and either the secondary coils 80 and 81 or the secondary coils 82 and 83 by including the core sample or other porous material as part of the magnetic flux path is small compared to the unbalance between the induced currents in the pair of secondary coils 80 and 81 or the pair of secondary coils 82 and 83 as a result of inability to wind the coils to cancel exactly the opposing voltages, the nulling circuit 12 is provided to compensate for the residual voltage between the voltage induced in the secondary coils 80 and 81 and the opposed voltage induced in the secondary coils 82 and 83. The nulling circuit effects this result by applying a voltage having the same amplitude but a phase difference of 180 degrees to the residual voltage in the secondary coils of transformer 73.

Power for operation of the nulling circuit is supplied from the source of alternating current 14 whereby any changes in the current to the transformer 73 and the metering circuit 13 are matched by changes in the current to the nulling circuit. Switch 135 is operated to connect conductor 140 with conductor 142 and conductor 141 with conductor 143 to impose a voltage upon the primary coil of transformer 123. This induces a voltage in the secondary coil of transformer 123 which in turn is mixed with the voltage produced from the secondary coil of transformer 102. The variable tap of potentiometer 121 is now operated to control the amplitude of the voltage imposed upon the primary coil of transformer 123. The voltage thus induced in the secondary coil of transformer 123 is then adjusted in phase and amplitude for mixing with the output voltage from transformer 102. This is effected by movement of the taps of potentiometer 121 and attenuator 131 until the reading of voltmeter 112 is at a minimum. The nulling voltage mixed with the voltage from the secondary coil of transformer 102 by adjustment of the taps of potentiometer 121 and of attenuator 131 will not ordinarily be 180 degrees out of phase with the unbalance voltage from transformer 73, and the necessary phase change in the voltage impressed upon the output voltage of the secondary coil of transformer 102 is effected by changing the resistance and capacitance in the secondary coil of transformer 123 by adjustment of decade condenser 130 and attenuator 124 and potentiometer 125. Adjustment is thus effected until the reading on voltmeter 112 is at a minimum. Adjustment of potentiometer 121 and attenuator 131 followed by adjustment of attenuator 124 and potentiometer 125 and decade condenser 130 is repeated until the reading on voltmeter 112 is zero.

It may occasionally happen that satisfactory adjustment of the phase of the voltage output of the secondary coil of transformer 123 cannot be effected by adjustment of attenuator 124 and potentiometer 125 and decade condenser 130. In such cases, additional phase control may be effected by opening switch 133 to introduce condenser 132 into the circuit of conductor 164. Further, where satisfactory adjustment of the phase of the voltage output of the secondary coil of transformer 123 is difficult, an improved adjustment may be effected by changing switch 135 whereby conductors 140 and 143 and conductors 141 and 142, respectively, are connected.

The unbalance voltage in transformer 73 having been completely opposed, the apparatus may be employed for determination of the fluid saturation of a core sample or sample of other porous material by measurement of its magnetic susceptibility. The core sample or sample of other porous material is covered with a fluid impermeable coating, as described hereinabove, and the opposite ends placed in the receivers 33 and 60. A manometer or other pressure measuring device is connected between the tap 54 and a tap connected to the channel 65 and a second manometer or other pressure measuring device is connected between the tap 55 and the tap connected to channel 65. Taps 46 and 51 are connected to sources of two different fluid phases, and the fluid phases are forced through the core sample or sample of other porous material at known rates of flow, measurement of the pressure drop of each of the fluid phases passing through the core sample or sample of other porous material being made by the manometers or other pressure measuring devices. From the rates of flow, the pressure drops and the viscosities of each of the fluid phases and the geometry of the core sample or sample of other porous material, the permeability of the core sample or sample of other porous material to each fluid phase can be determined. With knowledge of the amount of each fluid phase in the core sample or sample of other porous material, or the saturation to each fluid phase, the relative permeability of the core sample or sample of other porous material to each fluid phase may be determined.

In accordance with the invention, there is admixed with one of the fluid phases passed through the core sample or sample of other porous material a compound having paramagnetic properties. Any material having paramagnetic properties may be employed for this purpose providing that the material may be admixed with the fluid phase in sufficiently small aggregates that blockage of the interstices of the core sample or sample of other porous material does not occur and its admixture with the fluid phase does not affect the viscosity of the fluid phase to the point that the measurement of relative permeability of the fluid phase containing the admixed paramagnetic material is not satisfactorily representative of the relative permeability of the fluid phase in the absence of the admixed paramagnetic material or corrections for any differences cannot be made. The paramagnetic material may be soluble or insoluble in the phase in which it is admixed and it may be admixed in an oil phase or in a water phase. Insoluble paramagnetic materials that may be employed include metals such as iron, cobalt, or nickel, and these metals should be in a colloidal state of subdivision. It is preferred, however, that the paramagnetic material be soluble in the phase in which it is admixed. Where the paramagnetic material is admixed with the water phase, a water-soluble paramagnetic salt may be employed. The chlorides of iron, manganese, and cobalt are satisfactory although various other water-soluble compounds having paramagnetic properties may also be employed. Preferably, however, cobaltous chloride is employed. The paramagnetic material is admixed in the fluid phase at a known concentration, which may be of the order of twenty percent by weight where a chloride of iron, manganese, or cobalt is admixed with the water phase, although higher and lower concentrations may be employed if desired, and the resulting admixture or solution is employed as the fluid phase passed through the core sample or sample of other porous material and to which the relative permeability of the core sample or sample of other porous material is to be measured.

Measurement of the fluid saturation of the core sample or sample of other porous material may be made at any time during measurement of permeability by moving the sample holder 10 along the guides 21 and 22 until the sample supported within the receivers 33 and 60 is positioned between a pair of the secondary coils of transformer 73. With the sample positioned between a pair of the secondary coils, such as the core sample 101 positioned between secondary coils 80 and 81 as illustrated in Figure 2, an unbalance voltage results from the increased mutual inductance in these secondary coils compared to the other pair of secondary coils. In the apparatus of the invention, the unbalance is a linear function of the increase in magnetic permeability of the flux path and the increase in magnetic permeability of the flux path is a linear function of the quantity of paramagnetic material positioned between the secondary coils. The extent of unbalance is indicated by the voltmeter 112.

The core sample or sample of other porous material may not have a zero magnetic susceptibility per se. Accordingly, the core sample or sample of other porous material is placed between a pair of the secondary coils of transformer 73 prior to the time the paramagnetic material admixed with the fluid phase is contained therein and the extent of unbalance voltage, if any, is deducted from the unbalance voltage resulting when the core sample or sample of other porous material is placed between a pair of the secondary coils of transformer 73 at the time the paramagnetic material admixed with the fluid phase is contained therein. This deduction may be made by noting the deflection of the voltmeter and deducting this deflection from the deflection obtained with the core sample or sample of other porous material containing the paramagnetic material admixed with the fluid phase. It is preferred, however, because of the greater sensitivity of measurement thereby obtained, to make this deduction by completely opposing the unbalance due to the core sample or sample of other porous material per se in the same manner as the unbalance voltage in the transformer 73.

From the change in the magnetic susceptibility of the core sample or sample of other porous material due to the paramagnetic material admixed with the fluid phase contained therein, the amount of paramagnetic material contained within the sample, and thus the fluid saturation of the sample since the concentration of paramagnetic material admixed with the fluid phase is known, is determined by comparison with changes occurring when known amounts of the same paramagnetic material are placed similarly to the sample between a pair of the secondary coils of transformer 73.

Various changes in the above described method and apparatus may be made without departing from the spirit of the invention. For example, while the extent of fluid saturation of the core sample or sample of other porous material has been described as being indicated by the deflection of voltmeter 112, it will be understood that, with the sample positioned between a pair of secondary coils of transformer 73, the nulling circuit 12 may be employed to exactly oppose the resulting unbalance voltage and the voltage required by the nulling circuit to oppose the unbalance voltage may be taken to indicate the extent of fluid saturation. Further, while the extent of fluid saturation of the sample has been described as being determined by comparison of the unbalance voltage occurring with known amounts of the paramagnetic material, it will be understood that the extent of fluid saturation may be determined by measuring the change in the magnetic susceptibility of the core sample in absolute units. Additionally, the method and apparatus may be employed where relative permeability measurements are made with three fluid phases in the core sample or sample of other porous material. The method and apparatus, furthermore, may be employed in connection with the determination of properties other than relative permeability, as, for example, the method and apparatus may be employed in connection with the measurement of capillary pressure. Various other modifications will suggest themselves to those skilled in the art.

Having thus described our invention, it will be understood that such description has been given by way of illustration and example and not by way of limitation, reference for the latter purpose being had to the appended claims.

We claim:

1. In a process wherein a fluid is passed to a porous material, the method for determining the quantity of said fluid contained within said porous material comprising admixing with said fluid a known quantity of a material having paramagnetic properties, passing said fluid containing said admixed paramagnetic material to said porous material, and determining the effect of said paramagnetic material upon the magnetic susceptibility of said porous material as a measure of the quantity of said fluid containing said admixed paramagnetic material contained within said porous material.

2. The method of claim 1 wherein the paramagnetic material is iron.

3. The method of claim 1 wherein the paramagnetic material is cobalt.

4. In a process wherein a fluid is passed to a porous material, the method for determining the quantity of said fluid contained within said porous material comprising dissolving in said fluid a known quantity of a material having paramagnetic properties, passing said fluid containing said dissolved paramagnetic material to said porous material, and determining the effect of said paramagnetic material upon the magnetic susceptibility of said porous material as a measure of the quantity of said fluid containing said dissolved paramagnetic material contained within said porous material.

5. In a process wherein water is passed to a porous material, the method for determining the quantity of said water contained within said porous material comprising dissolving in water a known quantity of a compound having paramagnetic properties, passing said water containing said dissolved paramagnetic compound to said porous material, and determining the effect of said paramagnetic compound upon the magnetic susceptibility of said porous material as a measure of the quantity of said water containing said dissolved paramagnetic compound contained within said porous material.

6. The method of claim 5 wherein the paramagnetic compound is a compound selected from the group consisting of the chlorides of iron, manganese, and cobalt.

7. The method of claim 5 wherein the paramagnetic compound is cobaltous chloride.

8. The method of claim 5 wherein the paramagnetic compound is manganous chloride.

9. The method of claim 5 wherein the paramagnetic compound is ferrous chloride.

10. The method of claim 5 wherein the porous material is a core sample taken from the earth and the paramagnetic compound is cobaltous chloride.

11. The method of claim 5 wherein the porous material is a core sample taken from the earth and the paramagnetic compound is manganous chloride.

12. The method of claim 5 wherein the porous material is a core sample taken from the earth and the paramagnetic compound is ferrous chloride.

13. In apparatus for measuring as a function of the magnetic susceptibility of a porous material the quantity of a fluid admixed with a material having paramagnetic properties and contained within said porous material, a base, a transformer core supported on said base, a primary coil wound about said transformer core, two pairs of secondary coils wound about said transformer core with each pair having an air gap therebetween, each coil of each of said pairs being connected in series aiding and said pairs being connected in series opposition, means for connecting a source of alternating current to said primary coil, means for connecting a metering circuit to said secondary coils, means for connecting a source of nulling voltage to said metering circuit, a framework slidably mounted on said base, a pair of receivers mounted oppositely to each other in said framework and adapted to receive the ends of a sample of a porous material, and means for passage of a fluid through each of said receivers.

14. In apparatus for measuring as a function of the magnetic susceptibilty of a porous material the quantity of a fluid admixed with a material having paramagnetic properties and contained within said porous material, a base, a transformer core supported on said base, a primary coil wound about said transformer core, two pairs of secondary coils wound about said transformer core with each pair having an air gap therebetween, each coil of each of said pairs being connected in series aiding and said pairs being connected in series opposition, means for connecting a source of alternating current to said primary coil, means for connecting a metering circuit to said secondary coils, means for connecting a source of nulling voltage to said metering circuit, a framework slidably mounted on said base, a pair of receivers mounted oppositely to each other in said framework at a level between one of said pairs of secondary coils and adapted to receive the ends of a sample of a porous material, and means for passage of a fluid through each of said receivers.

15. In apparatus for measuring as a function of the magnetic susceptibility of a porous material the quantity of a fluid admixed with a material having paramagnetic properties and contained within said porous material, a base, a transformer core supported on said base, a primary coil wound about said transformer core, two pairs of secondary coils wound about said transformer core with each pair having an air gap therebetween, each coil of each of said pairs being connected in series aiding and said pairs being connected in series opposition, means for connecting a source of alternating current to said primary coil, means for connecting a metering circuit to said secondary coils, means for connecting a source of nulling voltage to said metering circuit, a framework slidably mounted on said base, a pair of receivers mounted oppositely to each other in said framework at a level between one of said pairs of secondary coils and adapted to receive the ends of a sample of a porous material, and means providing a channel in one of said receivers and a pair of channels in the other of said receivers for passage of a fluid through said receivers.

16. In apparatus for measuring as a function of the magnetic susceptibility of a porous material the quantity of a fluid admixed with a material having paramagnetic properties and contained within said porous material, a base, a transformer core supported on said base, a primary coil wound about said transformer core, two pairs of secondary coils wound about said transformer core with each pair having an air gap therebetween, each coil of each of said pairs being connected in series aiding and said pairs being connected in series opposition, means for connecting a source of alternating current to said primary coil, means for connecting a metering circuit to said secondary coils, means for connecting a source of nulling voltage to said metering circuit, a pair of guides mounted on said base, a framework slidably connected to said guides, a pair of receivers mounted oppositely to each other in said framework at a level between one of said pairs of secondary coils and adapted to receive the ends of a sample of a porous material, and means providing a channel in one of said receivers and a pair of channels in the other of said receivers for passage of a fluid through said receivers.

References Cited in the file of this patent

UNITED STATES PATENTS

| | | |
|---|---|---|
| 1,925,904 | Mayne | Sept. 5, 1933 |
| 2,437,935 | Brunner et al. | Mar. 16, 1948 |
| 2,574,311 | Zuschlag | Nov. 6, 1951 |
| 2,613,250 | Bilhartz et al. | Oct. 7, 1952 |